United States Patent [19]
Underhill

[11] Patent Number: 6,098,391
[45] Date of Patent: Aug. 8, 2000

[54] ROUND BALE FORMING APPARATUS

[75] Inventor: Kenneth R. Underhill, Strasburg, Pa.

[73] Assignee: New Holland North America, Inc., New Holland, Pa.

[21] Appl. No.: 09/294,038

[22] Filed: Apr. 19, 1999

Related U.S. Application Data

[60] Provisional application No. 60/084,867, May 8, 1998.

[51] Int. Cl.$^7$ .................................................. A01D 39/00
[52] U.S. Cl. ............................................... 56/341; 100/88
[58] Field of Search ....................... 56/341, 343; 100/88, 100/89

[56] References Cited

U.S. PATENT DOCUMENTS

| | | | |
|---|---|---|---|
| 4,470,247 | 9/1984 | Mast .......................................... | 56/341 |
| 4,635,543 | 1/1987 | Clostermeyer et al. ................... | 56/341 |
| 4,759,279 | 7/1988 | Frerich ...................................... | 100/89 |
| 4,763,464 | 8/1988 | Mouret ...................................... | 56/341 |
| 4,870,812 | 10/1989 | Jennings et al. .......................... | 56/341 |
| 5,444,969 | 8/1995 | Wagstaff et al. .......................... | 56/341 |
| 5,931,089 | 8/1999 | Viesselmann et al. ................... | 100/88 |

FOREIGN PATENT DOCUMENTS

| | | |
|---|---|---|
| 0 954 959 | 11/1999 | European Pat. Off. . |
| 0 954 960 | 11/1999 | European Pat. Off. . |
| 0 954 961 | 11/1999 | European Pat. Off. . |

Primary Examiner—Thomas B. Will
Assistant Examiner—Nathan Mammen
Attorney, Agent, or Firm—Frank A. Seemar; Larry W. Miller; J. William Stader

[57] ABSTRACT

A round baler for forming crop material into cylindrical bales. The baler has a main frame, a pair of side walls, a crop pickup mounted on the main frame, and a tailgate pivotally connected to the main frame. The tailgate is operative between a closed position during which a bale is being formed in an expandable chamber, and an open position during which a formed bale is being discharged from the chamber. A sledge assembly, pivotally mounted on the main frame for movement between a bale starting position and a full bale position, has crop engaging transverse rollers for urging the crop material along a spiral path in the chamber for starting and forming a bale. A apron is supported along a continuous path on the main frame and tailgate by a plurality of rotatable guide members. The path has an inner course that cooperates with the sledge rolls on the sledge assembly to define moveable walls of the chamber. A drive roll moves the apron along the continuous path. A take up assembly, affixed to the sledge assembly, moves therewith between the bale starting position and full bale position to provide slack in the apron under conditions where the tailgate is moved from its closed position to its open position, thereby causing the drive roll to become disengaged from the apron.

16 Claims, 4 Drawing Sheets

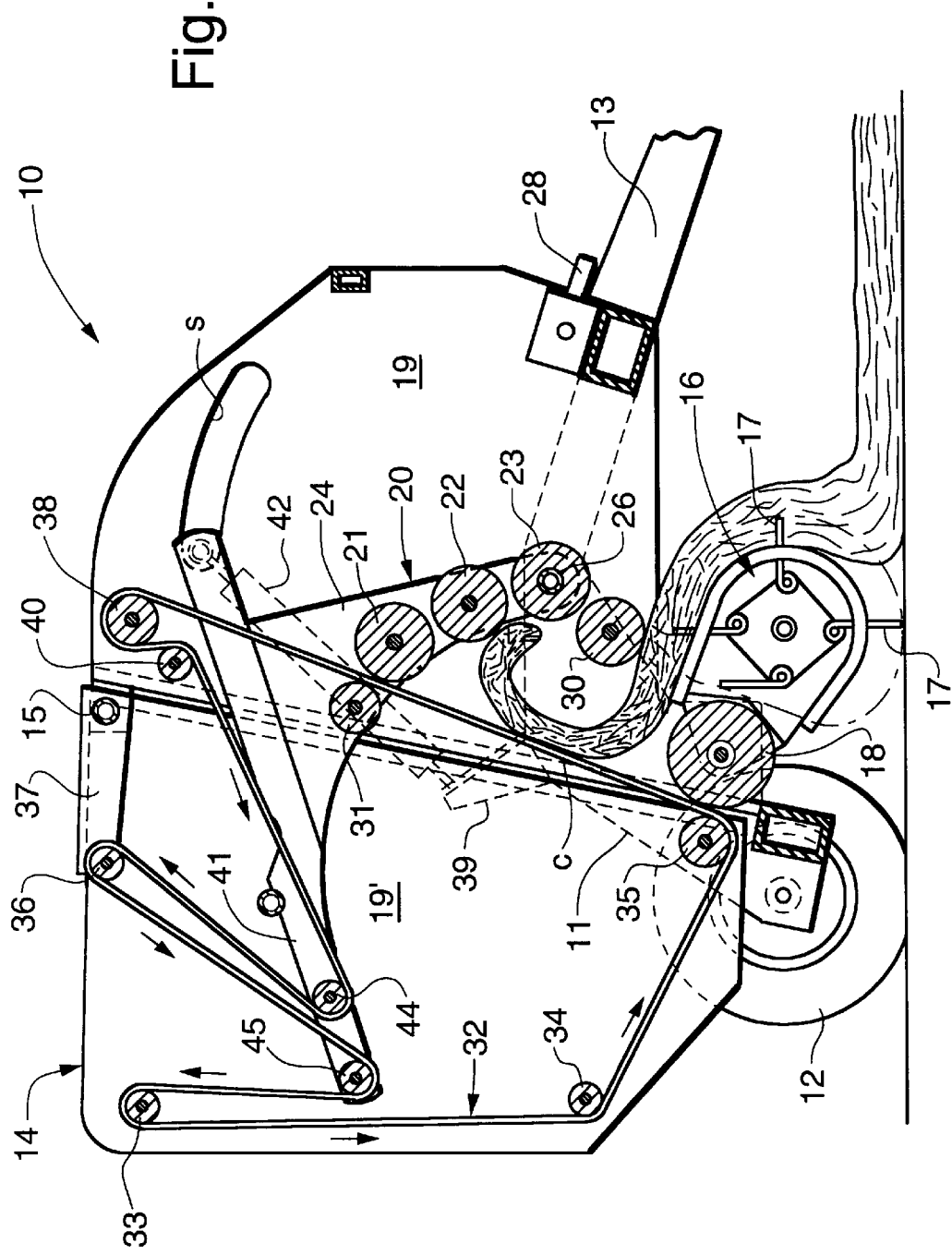

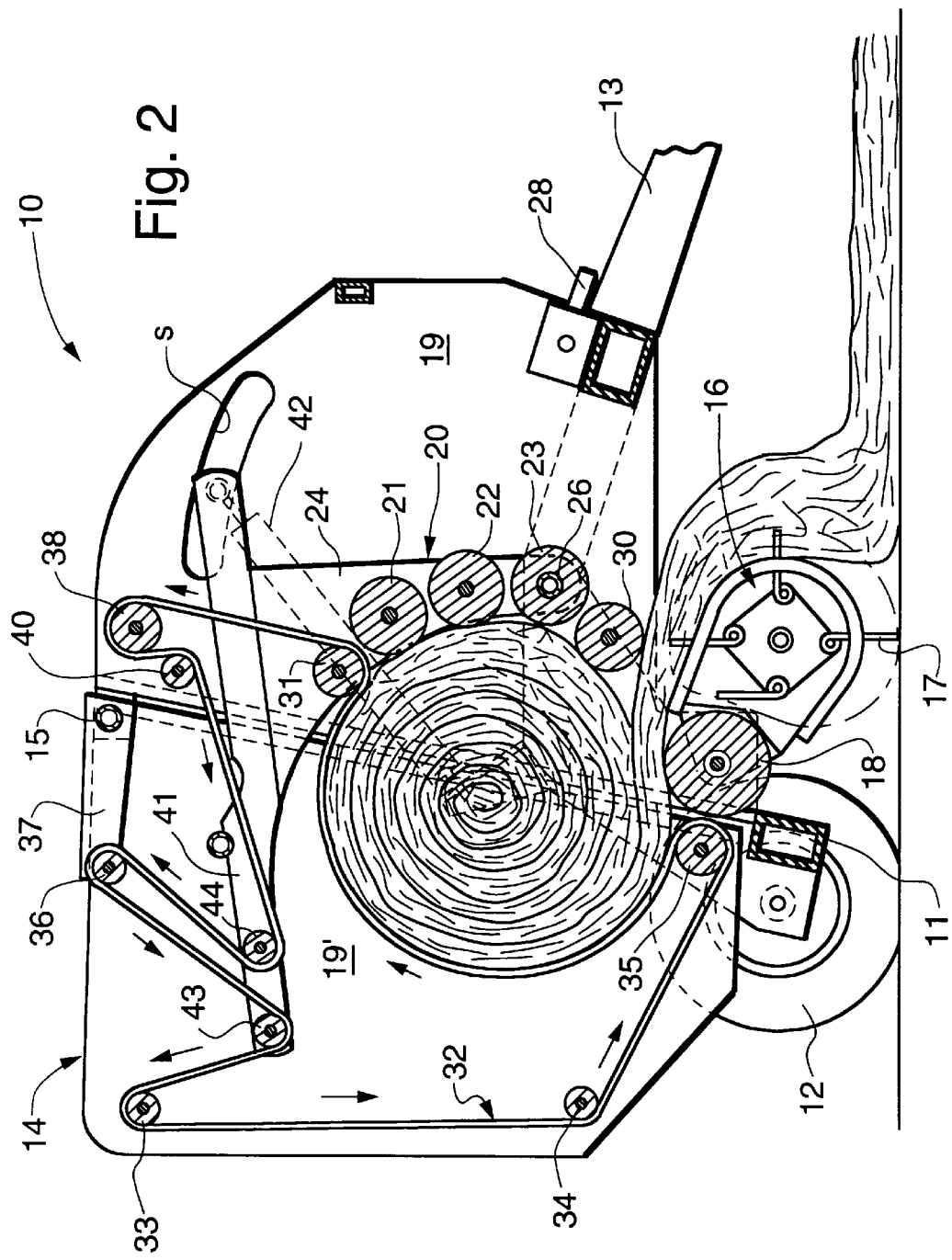

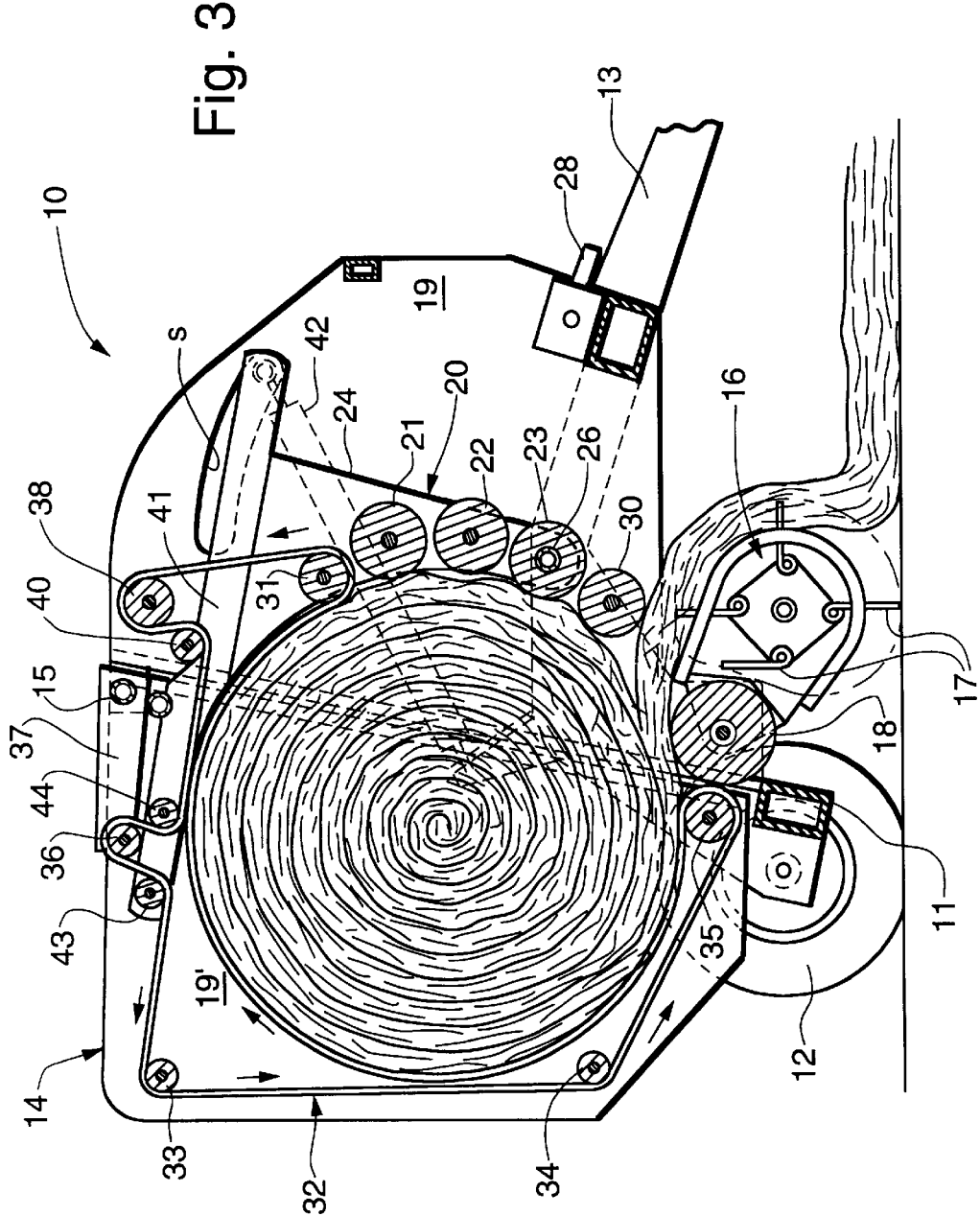

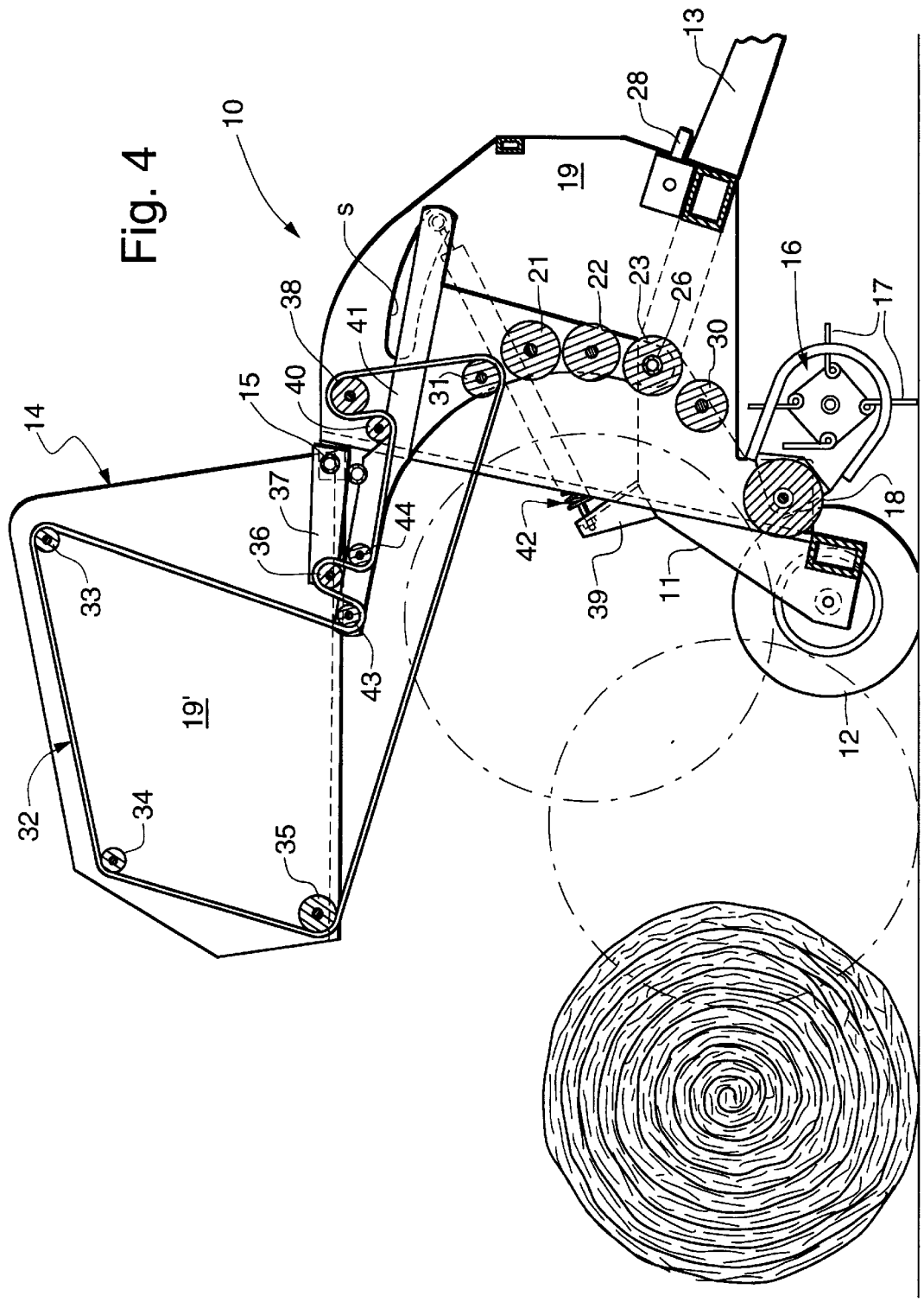

ROUND BALE FORMING APPARATUS

CROSS REFERENCE TO RELATED APPLICATION

This application claims the benefit of U.S. Provisional Application Ser. No. 60/084,867, filed May 8, 1998, and entitled "Round Bale Forming Apparatus".

FIELD OF THE INVENTION

The present invention relates to agricultural apparatus for forming and wrapping cylindrical packages of crop material, generally referred to as round balers, and more particularly to a round baler in which a package of crop material, formed in an expandable, generally cylindrically shaped forming chamber, is wrapped with twine or net to produce a round bale, and then discharged from the baler.

BACKGROUND OF THE INVENTION

Round balers generally have a bale forming chamber defined by a pair of opposing side walls associated with an array of side-by-side belts, transverse slats trained on chains, a plurality of transverse rolls or a combination of these various elements, e.g., rolls and belts. During field operation, windrowed crop material such as hay is picked up from the ground and fed into a fixed or variable diameter chamber. The hay is then rolled into a cylindrical package, wrapped with twine, net or the like and ejected onto the ground for subsequent handling.

U.S. Pat. No. 5,444,969, issued Aug. 29, 1995 in the name of Robert A. Wagstaff, et al, discloses a prior art round baler of the general nature described above. In this particular type of baler an expandable chamber is defined by a pair of sidewalls, and a plurality of side-by-side belts cooperating with a plurality of transverse rolls, mounted between a pair of pivotally mounted arms. The chamber includes an inlet opening in the front through which crop material is fed. The aforementioned arrangement of rolls and arms is commonly referred to as a sledge assembly. Also shown in the disclosed baler is a pair of take up arms pivotally mounted on the main frame, between which arms a pair of guide rolls are journalled. The outer surfaces of the guide rolls are urged against the belts to maintain belt tension and thereby prevent slack from occurring in the belts during expansion and contraction of the chamber.

The present invention relates to an improved round baler in which a cylindrical package of crop material is formed between expandable walls consisting of a combination of belts and rolls of the general nature described in the preceding paragraph. The '969 patent, cited above, is an example of many prior art patents, assigned to New Holland North America, Inc., that disclose this type of round baler. This invention is directed to unique structural characteristics, described below, that contribute to a round baler featuring, among other things, enhanced performance, simplified construction and improved durability. Additionally, there is a noted improvement in the appearance of round bales formed by the baler of the present invention.

SUMMARY OF THE INVENTION

An important object of the present invention is to provide a simplified design for a round baler with an expandable bale forming chamber including belts and transverse rolls.

Another important object of the present invention is to provide a round baler having an expandable bale forming chamber including belts and rolls, wherein a belt take up assembly is configured to interrupt belt drive during bale discharge.

Still another important object of the present invention is to provide a round baler having an expandable bale forming chamber defined in part by belts and rolls, wherein the belt take up assembly is configured to yield slack in the belts during bale discharge to interrupt belt motion and avoid scuffing of the surface of the bale.

Yet another important object of the present invention is to provide a round baler having an expandable bale forming chamber defined in part by belts and rolls, wherein the belt take up assembly and sledge assembly operate in concert to improve belt tracking.

A further important object of the present invention is to provide a round baler having an expandable bale forming chamber defined in part by belts and rolls, wherein the belt take up assembly and sledge assembly operate in concert to prevent surging of the cylindrical package of crop material during formation of the bale.

Still a further important object of the present invention is to provide a round baler having an expandable bale forming chamber defined in part by belts and rolls, wherein the belt take up assembly is configured to minimize contact between the bale and the belts during bale discharge.

In pursuance of these and other important objects the present invention contemplates a baler comprising a main frame, including a pair of opposing side walls, and a tailgate, pivotally connected to the main frame. The tailgate is operative between a closed position during which a bale is being formed, and an open position during which a formed bale is being discharged. The baler further comprises a sledge assembly, mounted on the main frame for movement between a bale starting position and a full bale position, having conveying means with a crop engaging surface extending transversely of the main frame. An apron is supported along a continuous path on the main frame and on the tailgate by a plurality of rotatable guide members, the apron path having an inner course that cooperates with the side walls and the conveying means on the sledge assembly to define a bale forming chamber. Drive means operatively engage the apron to move it along the continuous path. The baler still further comprises a forwardly mounted pickup for feeding crop material into the chamber. An important aspect of the present invention is a take up arm affixed to the sledge assembly for movement therewith between the bale starting position and the full bale position. Operatively associated with the take up arm is at least one of the rotatable guide members, which comprises a take up roll mounted on the distal end of the take arm for providing slack in the apron under conditions where the tailgate is moved from the closed position to the open position thereby causing the drive means operatively engagable with the apron to become disengaged from the apron.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 1 is a diagrammatic side elevational view of a round baler in which the present invention is incorporated. The tailgate is in the closed position and the elements of the bale forming chamber are shown in their core starting condition.

FIG. 2, generally similar to FIG. 1, is a diagrammatic side elevational view of a round baler in which the tailgate is in the closed position and the elements of the bale forming chamber are shown in an intermediate bale forming condition.

FIG. 3, also generally similar to FIG. 1, is a diagrammatic side elevational view of a round baler in which the tailgate is in the closed position and the elements of the bale forming chamber are shown in the full bale condition.

FIG. 4, also a diagrammatic side elevational view of a round baler, shows the tailgate in the open position and the relationship of the elements of the bale forming chamber after a bale has been discharged.

DESCRIPTION OF THE PREFERRED EMBODIMENT

Referring to the drawings for a detailed description of the preferred embodiment of the invention, FIG. 1 shows the cross section of a round baler 10 of the type having an expandable chamber defined in part by belts and rolls. This type of expandable chamber is disclosed in various prior art patents, e.g., U.S. Pat. No. 5,444,969 mentioned above, and earlier U.S. Pat. No. 4,870,812, issued Oct. 12, 1989 in the name of Richard E. Jennings, et al, both of which are hereby incorporated by reference. It should be noted that throughout this description the drawings are diagrammatic in nature to best show the elements of the invention. To this end, in many instances only one element in a pair is shown, especially in those cases where identical elements exist, disposed on opposing sides of the baler, e.g., wheels.

Baler 10 has a main frame 11, comprising a plurality of rigid interconnected structural elements including a pair of side walls 19 (only one shown). Main frame 11 is supported by a pair of wheels 12 (also only one shown). A forwardly mounted tongue 13, integral with main frame 11, provides for connection to a tractor. Pivotally connected to side walls 19 by a pair of stub shafts 15 (only one shown) is a tailgate 14 which is closed during bale formation. Tailgate 14 includes sidewalls 19' coplanar with side walls 19. A pickup 16, mounted on main frame 11, includes a plurality of tines 17, the tips of which are movable along a predetermined path to lift crop material from the ground and deliver it rearwardly toward a floor roll 18, rotatably mounted on main frame 11.

An expandable chamber for forming bales is defined partly by a sledge assembly 20 comprising a plurality of transversely extending rolls 21, 22, 23 journalled at their ends in a pair of spaced apart arms 24, one of which is shown. These arms are pivotally mounted on stub shafts 26 for providing movement of sledge assembly 20 from the bale starting position shown in FIG. 1 through the partly full position shown in FIG. 2 to the full bale position shown in FIG. 3, and finally to the bale discharge position shown in FIG. 4. Rolls 21, 22, 23 are driven in a counter-clockwise direction by conventional means (for example, chains and sprockets) coupled via an appropriate drive train to a drive shaft 28. A starter roll 30, located adjacent roll 23, is also driven counter-clockwise. Sledge assembly 20 includes a forth roll, a freely rotatable idler roll 31, also carried between arms 24.

The bale forming chamber is further defined by an apron 32 comprising a plurality of laterally spaced side-by-side belts supported by guide rolls 33, 34, 35, rotatably mounted in tailgate 14, and roll 36, rotatably mounted on stationary arms 37, affixed to main frame 11. Apron 32 is also supported on a drive roll 38, mounted on main frame 11. Although apron 32 passes between roll 21 and idler roll 31, it is in engagement only with idler roll 31 and not roll 21 which serves to strip crop material from the belts, in addition to its bale forming function. Suitable coupling means (not shown) connected to drive shaft 28 provide rotation of drive roll 38 causing movement of apron 32 along the varying paths in the directions indicated by the arrows in FIGS. 1, 2 and 3. An additional guide roll 40 in the main frame 11 ensures proper driving engagement between apron 32 and drive roll 38.

A pair of take up arms 41 (only one shown), integral with sledge assembly 20, are affixed to sledge arms 24 for movement between inner, intermediate, outer and bale discharge positions shown in FIGS. 1, 2, 3 and 4, respectively. Take up arms 41, which carry additional guide rolls 43, 44 for supporting apron 32, are urged with sledge assembly 20 toward the innermost position (FIG. 1), i.e., bale starting position, by spring 42, mounted between one of arms 41 and bracket assembly 39, secured to main frame 11. Spring 42, mounted outwardly from wall 19, is pivotally secured to arm 41 by journal means extending through access slot s in side wall 19.

When the elements of round baler 10 are disposed as shown in FIG. 1, an inner course c of apron 32 extends between guide roll 35 and idler roll 31 to form the rear wall of the core starting chamber while the inwardly facing peripheral surfaces of rolls 21, 22, 23 define in a general manner a rearwardly inclined cooperating front wall. Floor roll 18 defines the bottom of the chamber and with starter roller 30 provides an inlet for crop material.

When round baler 10 travels across a field, pickup tines 17 lift crop material from the ground and deliver it through the inlet. The crop material is carried rearwardly by floor roll 18 into engagement with apron inner course c (FIG. 1) which urges it upwardly and forwardly into engagement with the rolls on sledge 20. In this manner crop material is coiled in a clockwise direction to start a bale core. Continued feeding of crop material into the bale forming chamber by pickup tines 17 causes the apron inner course c to expand in length around a portion of the circumference of the cylindrical package of crop material as its diameter increases (FIG. 2). Take up arms 41 rotate with sledge assembly 20 about the coaxial horizontal axes of stub shafts 26 from their initial positions shown in FIG. 1 toward their outer positions shown in FIG. 3 to provide for expansion of the inner course of the apron in a manner similar to that of the prior art balers mentioned above, i.e., in effect the outer course of the belts of apron 32 is diminished in length while the inner course increases a like amount. After a cylindrical package of crop material has been formed in the fashion described and wrapped with twine or net in a well known manner to form a bale, tailgate 14 is opened and the bale is ejected rearwardly as shown in FIG. 4. Subsequent closing of tailgate 14 returns the inner and outer courses of the belts of apron 32 to the locations shown in FIG. 1.

During bale formation, sledge assembly 20, due to its unification with the take up assembly, also moves between a bale starting position (FIG. 1) to a full bale position (FIG. 3). This movement of sledge assembly 20 causes idler roll 31 to move along a generally arcuate path while maintaining apron 32 in close proximity to roll 21, thereby allowing roll 21 to strip crop material from the belts and prevent or reduce significantly the loss of crop material through the space between roll 21 and apron 32 during formation of a bale. Sledge assembly 20 is pushed outwardly towards its full bale position during bale formation as the crop material expands against rolls 21, 22, 23 and then subsequently is returned inwardly by apron 32 to the position shown in FIG. 1.

With the above description and general operation of baler 10 as a background, attention will now be directed to important features of this new takeup/sledge structure. As will become apparent, baler 10 is merely illustrative of one of the many round baler configurations to which the features of the present invention are adaptable. For example, varying the number of rolls on the sledge assembly would have no affect on the general aspects of the present invention.

To further enhance understanding of the various features of the present invention, it should be noted that by unifying the sledge and take up assemblies, many advantages are realized, not the least of which is the capability of interrupting the drive to the belts during discharge. This obviates scuffing of the outer surface of the completed bale, without the need for mechanically declutching the belt drive mechanism. This is accomplished during movement of take up arm 41, affixed to sledge assembly 20, between the bale starting position and the full bale position. Take up rollers 43, 44 mounted on the distal end of the take arm 41, provide slack in the apron under conditions where the tailgate is moved from the closed position toward the open position causing the drive roll 38, normally operatively engagable with the apron, to become disengaged from the apron during discharge. The slack occurs under conditions where the belt path is reduced as the tailgate begins to open and the takeup rolls are held in place by the sledge/takeup assembly, which does not move as the tailgate opens. Thus, the normal function of the takeup system is prevented until the bale is discharged. This avoids scuffing of the outer surface of the completed bale because the tendency for the belts to be driven in a direction contrary to the direction of the outer surface of the bale, rotating in a clockwise direction during discharge, is obviated.

Another significant advantage over the prior art realized by the unique design of the present invention is the reduction of belt idler roll damage caused by bale surging when the shape of the bale is not symmetrical. The takeup arm prevents surging by holding the crop package forward against the sledge, i.e., it does not operate independent of the sledge. In prior art roll/belt balers, under uneven bale shape conditions the independent operation of the takeup assembly resulted in a tendency for it to have a deleterious influence on the proclivity of an unevenly shaped bale to serge rearwardly. Further, the takeup arm of the present invention holds the bale at a higher location during bale ejection, resulting in less interference during bale discharge.

It should also be noted that this unique sledge and takeup arrangement is less costly and less complex than the arrangement used in prior art round balers in that there is a common pivot axis for the sledge and the take up systems. Additionally, this enhances belt tracking by reducing the tendency for the rolls of unified structure to become askew.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A round baler for forming crop material into cylindrical bales, said baler having
    a main frame,
    a tailgate pivotally connected to said main frame said tailgate operative between a closed position during which a bale is being formed, and an open position during which a formed bale is being discharged,
    a sledge assembly mounted on said main frame for movement between a bale starting position and a full bale position, said sledge assembly including conveying means having a crop engaging surface extending transversely of said main frame,
    an apron supported along a continuous path on said main frame and on said tailgate by a plurality of rotatable guide members, said apron path having an inner course that cooperates with said conveying means on said sledge assembly to define a bale forming chamber,
    drive means for moving said apron along said continuous path, said drive means including means operatively engagable with said apron, and
    a pickup for feeding crop material into said chamber, the improvement comprising
    a pair of take up arms affixed to said sledge assembly for movement therewith between said bale starting position and said full bale position, and
    one of said rotatable guide members comprises a take up roll mounted between the distal ends of said take up arms, said take up roll providing slack in said apron under conditions where said tailgate is moved from said closed position to said open position, causing said means operatively engagable with said apron to become disengaged from said apron.

2. In a round baler as set forth in claim 1 wherein said apron comprises a plurality of side-by-side belts.

3. In a round baler as set forth in claim 2 wherein said drive means comprise a driven roll having an outer generally cylindrical surface in frictional engagement with said belts under conditions where said tailgate is closed.

4. In a round baler as set forth in claim 1 wherein said sledge assembly conveying means comprise at least two driven rolls, the outer surfaces of which engage said crop material under conditions where said pickup feeds the crop material into said chamber, said rolls driven in a direction that urges said crop material along a spiral path in said chamber.

5. In a round baler as set forth in claim 4 wherein one of said at least two driven rolls is pivotally mounted on said main frame.

6. In a round baler as set forth in claim 5 further having a spring assembly including resilient means for providing a force to urge said take up arms and said sledge assembly to said bale starting position.

7. In a round baler as set forth in claim 6 wherein said resilient means is affixed at one end to at least one of said take up arms and affixed at the other end to said main frame, whereby said force urges said take up arms and said sledge assembly to pivot about said one of said at least two driven rolls.

8. In a round baler as set forth in claim 5 wherein another one of said rotatable guide members comprises a second take up roll mounted adjacent said take up roll between the distal ends of said take up arms, said take up roll and said second take up roll acting in concert to provide slack in said apron under conditions where said tailgate is moved from said closed position to said open position, causing said means operatively engagable with said apron to become disengaged from said apron.

9. A round baler for forming crop material into cylindrical bales, comprising in combination
    a main frame,
    a tailgate pivotally connected to said main frame, said tailgate operative between a closed position during which a bale is being formed and an open position during which a formed bale is being discharged, a sledge assembly mounted on said main frame for movement between a bale starting position and a full bale position, said sledge assembly including conveying means having a crop engaging surface extending transversely of said main frame, an apron supported along a continuous path on said main frame and on said tailgate by a plurality of rotatable guide members, said apron path having an inner course that cooperates with said conveying means on said sledge assembly to define a bale forming chamber, drive means for moving said apron along said continuous path, said drive means including means operatively engagable with said apron, a pickup for feeding crop material into said chamber, and a take up assembly affixed to said sledge assembly for movement therewith between said bale starting position and said full bale position, one of said rotatable guide members comprising a take up roll mounted on said take up assembly, said take up roll providing slack in said apron under conditions where said tailgate is moved from said closed position to said open position, causing said means operatively engagable with said apron to become disengaged from said apron.

10. In a round baler as set forth in claim 9 wherein said apron comprises a plurality of side-by-side belts.

11. In a round baler as set forth in claim 10 wherein said drive means comprise a driven roll having an outer generally cylindrical surface in frictional engagement with said belts under conditions where said tailgate is closed.

12. In a round baler as set forth in claim 9 wherein said sledge assembly conveying means comprise at least two driven rolls, the outer surfaces of which engage said crop material under conditions where said pickup feeds the crop material into said chamber, said rolls driven in a direction that urges said crop material along a spiral path in said chamber.

13. In a round baler as set forth in claim 12 wherein one of said at least two driven rolls is pivotally mounted on said main frame.

14. In a round baler as set forth in claim 13 wherein said combination further comprises a spring assembly including resilient means for providing a force to urge said take up assembly and said sledge assembly to said bale starting position.

15. In a round baler as set forth in claim 14 wherein said resilient means is affixed at one end to said take up assembly and affixed at the other end to said main frame, whereby said force urges said take up assembly and said sledge assembly to pivot about said one of said at least two driven rolls.

16. In a round baler as set forth in claim 13 wherein another one of said rotatable guide members comprises a second take up roll mounted adjacent said take up roll on the said take up assembly, said take up roll and said second take up roll acting in concert to provide slack in said apron under conditions where said tailgate is moved from said closed position to said open position, causing said means operatively engagable with said apron to become disengaged from said apron.

* * * * *